United States Patent [19]

Opron et al.

[11] 4,104,827
[45] Aug. 8, 1978

[54] PIVOTING AND SLIDING WINDOW

[75] Inventors: Robert Opron, Verrieres le Buisson; Philippe Bourguignon, Paris; Claude Guelton, Maurepas, all of France

[73] Assignee: Regie Nationale des Usines Renault, Boulogne-Billancourt, France

[21] Appl. No.: 767,159

[22] Filed: Feb. 9, 1977

[30] Foreign Application Priority Data

Feb. 11, 1976 [FR] France ............... 76 03716

[51] Int. Cl.$^2$ ............... E06D 7/00; E06B 3/34
[52] U.S. Cl. ............... 49/385; 49/39; 49/41; 49/48; 49/362
[58] Field of Search ............... 49/41, 39, 385, 371, 49/48, 362; 160/186, 187

[56] References Cited

U.S. PATENT DOCUMENTS

| 823,350 | 6/1906 | Morrill ............... 49/41 |
| 1,968,700 | 1/1935 | Zimmerman ............... 49/48 X |
| 2,719,750 | 10/1955 | Orr ............... 49/385 |

FOREIGN PATENT DOCUMENTS 1,337,208   8/1963   France ............... 49/48

Primary Examiner—Philip C. Kannan
Attorney, Agent, or Firm—Oblon, Fisher, Spivak, McClelland & Maier

[57] ABSTRACT

A window, especially for an automobile body, which consists of two sliding glass sections pivoting about a common superior axis in such a manner as to constitute a total glass surface, somewhere between a quarter circle and a semi-circle in form, limited above by the straight sides of the body. The sections are operated by means of a locking catch or by means of a toothed gear control mechanism.

11 Claims, 6 Drawing Figures

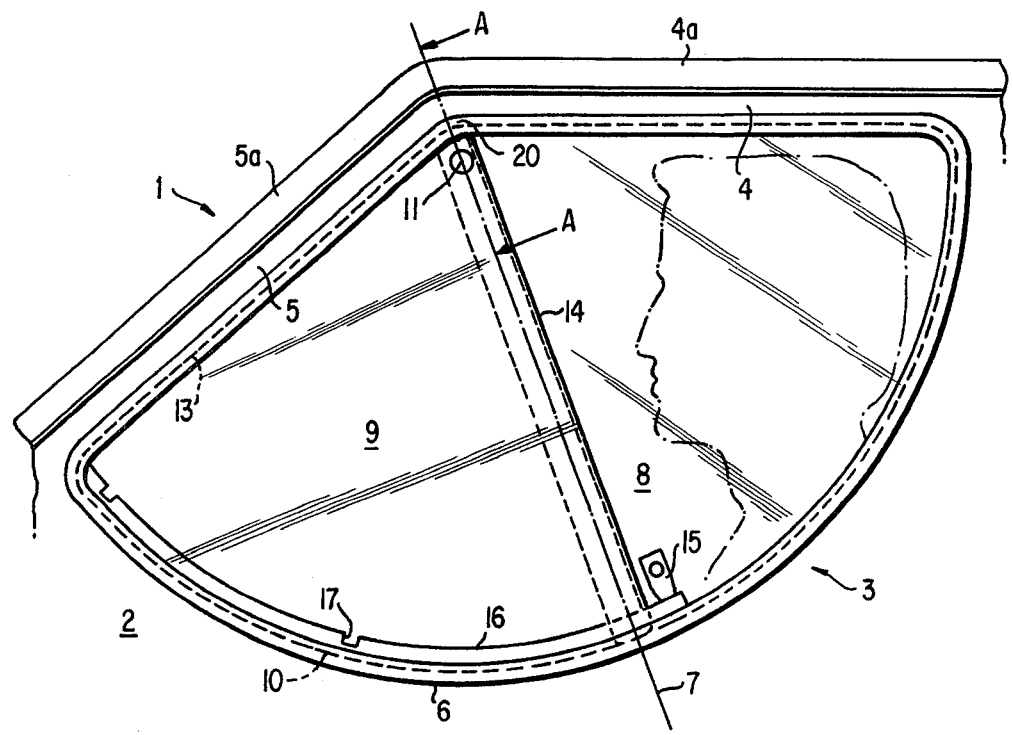
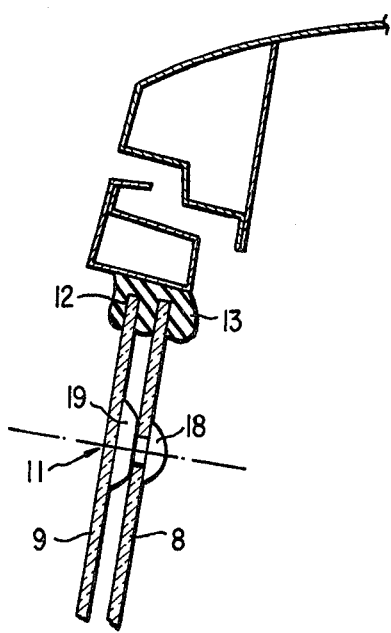
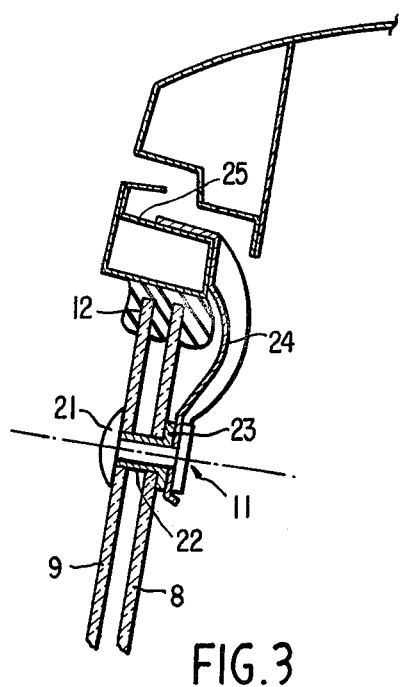
FIG.1
FIG.2
FIG.3

PIVOTING AND SLIDING WINDOW

BACKGROUND OF THE INVENTION

1. Field of the Invention

The present invention is concerned with sliding windows intended to serve as automobile windows and in particular with a window, in the shape of a sector, which pivots about an axis.

2. Description of the Prior Art

Traditionally, flat windows slide in their plane, following a straight path, either vertical or horizontal. Generally, the window has a simple geometric shape, in which two opposite parallel sides are guided in grooves forming the frame of the window. In the case of windows sliding horizontally, the window may be divided into two glass sections of approximately the same size and the sections slide on their respective guide rails with relation to one another. It has been common practice to put the section of the window which is outermost with respect to the plane of the car door towards the front of the vehicle so that its overlap with the so-called interior section of the window will impede the undesirable entry of air due to the speed of the vehicle when the two windows are in the closed position. It is known, as well, for the overlap of the windows, that a small inclination with respect to the vertical may serve to impede the entry of rain.

All these methods have their advantages, but they also have several deficiencies where comfort is concerned. For example, the area exposed by the complete opening of one of the windows remains rather small and makes difficult, if not impossible, any operation by the driver requiring access to the immediate exterior vicinity of the window. These exterior operations are rather frequent, whether for easy access to the exterior rear view mirror, to permit its adjustment, or for any other action not requiring exit from the vehicle, such as is the case for payment of tolls at a manual or automatic toll booth or in a parking lot, for example. It is also the case when the driver finds it necessary to lean his head outside the window in order to back up with better visibility.

Furthermore, the weight of the window is supported by the lower edge in sliding contact with the straight guide rail. The coefficient of friction is thus significant and frequent use of the window eventually leads to premature wear of the track and to more and more difficulty in sliding the window. Increased play between the window and the guide rail may also make the window twist slightly in the plane with respect to its direction of movement, while being operated, and the slight blockage which results thus interferes with the proper functioning of the window, which then slides jerkily and thus lacks smoothness.

A window treatment is already known in the shape of a sector, mounted on the rear lateral wall of a vehicle, and whose single window, having the same shape, pivots about an inferior axis by means of an articulated system housed in the interior of the body.

This configuration is not conveniently applicable to a forward window treatment since the glass sector is a quarter of a circle, and consequently the field of visibility and accessibility to the exterior would be even more limited than for a rectilinear sliding window with parallel sides. Moreover, the axis of rotation, located at the lower part of the window, puts it in an unstable equilibrium. Thus one is obliged to envision a retaining system such as the aforementioned articulated system.

SUMMARY OF THE INVENTION

Thus, an object of this invention is to produce a new type of sliding window which clearly avoids the disadvantages mentioned above, along with several varieties of control systems for the window.

Towards this end, the object of the present invention is attained by a window, especially for use in the body of an automobile, comprising a sliding window in the shape of a sector pivoting in its own plane about an axis located in the angle formed by the junction of the straight sides of the sector, and characterized by the fact that the window consists of two glass sectors which can pivot about a common superior axis.

According to one embodiment of the invention, the glass sectors, when in the closed position, cover a total area having a shape between a quarter circle and a semicircle.

According to another embodiment, the two sectors are movable and operated by a control mechanism mounted on the door frame, approximately in the middle of the curvile side of the window, and comprising two gears mounted on a common shaft, such that each gear engages teeth set along the curved side of the corresponding sector, and such that the selection of a gear by means of a locking mechanism, followed by rotation of the shaft by means of a knob, makes it possible, with one selection, to make one of the sectors pivot in one direction and, with a second selection, to make the other sector pivot in the opposite direction to the first, by means of an intermediate gear.

BRIEF DESCRIPTION OF THE DRAWINGS

Other characteristics of the invention will become apparent from the following description of an embodiment, taken as an example and illustrated in the attached drawings, in which:

FIG. 1 is an elevation view of a window consisting of two pivoting sectors, according to the invention;

FIG. 2 represents a sectional view along the line AA of FIG. 1, the common axis of rotation;

FIG. 3 represents, in a similar sectional view, a different mounting of the common axis of rotation;

DETAILED DESCRIPTION OF THE ILLUSTRATED EMBODIMENTS

Figure 4:
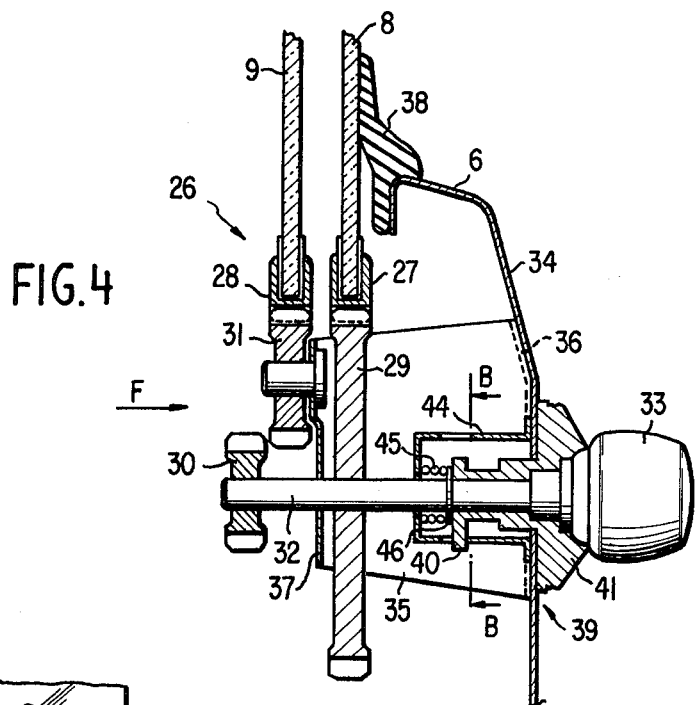
FIG. 4 represents a sectional view of a selective mechanism for controlling the rotation of the glass sectors by gears and teeth.

In FIG. 1, the upper front part of the body 1 of an automobile may be recognized. The top of the front door 2 constitutes the frame of the window 3 which exhibits a sectional shape, that is, the glass area is enclosed above by the two straight sides 4 and 5 running along the top 4a and the front post 5a and forming between them an obtuse angle, and below by a curved side 6 centered along the bisector 7 of the angle formed by the straight sides 4, 5. According to the invention, the window is composed of two glass sectors, the interior 8 and the exterior 9, respectively, with respect to the plane of the window, each of them being able to slide in its own plane along its curved side in a corresponding track 10 provided on the curved side 6 of the window. In the course of sliding, each sector pivots around a common axis 11 situated on the upper part of the window, in the angle formed by the straight sides 4, 5 of the window on the one hand and the sides of the glass sectors on the other hand. In the completely closed position, the two glass sectors 8, 9 of identical areas, overlap partially about in the middle of the window, near the aforementioned bisector 7. In that position, the glass sectors cover a substantial area comprising between a quarter of a circle and a semicircle, thus affording the driver excellent lateral visibility and good access to the exterior, after opening one or the other of the glass sectors.

To achieve waterproof conditions, the sectors are encased along one of their straight sides and along their curved side in a groove 12 of an elastic seal 13 with which the window frame is provided. The exterior sector 9 is placed towards the front of the vehicle and the interior sector 8 towards the rear so that air currents due to the speed of the automobile cannot seep in between the sectors, because of the overlap between their straight sides situated near the bisector 7 and because of the presence of a waterproof seal 14 practically running along the bisector and being glued to either one of the sectors or affixed to one of the overlapping straight sides.

The control of at least one sector is achieved by means of a manipulating device, such as a locking catch 15, which also permits holding the sector in several intermediate positions as well as in its completely closed position. This device is the subject of U.S. Pat. No. 1,302,450 in the name of the applicant and it would not be useful to discuss it in detail. The locking catch 15, illustrated in FIG. 1 is integral with the interior sector 8 so that it may slide forwards, following a guide rail 16 provided with slots 17, corresponding to intermediate positions. A second locking catch, not illustrated, may be attached to the interior wall of the exterior sector near the angle formed by the straight side 5 and the curved side 6 of the window. The same part of the guide rail 16 is thus used to slide the exterior sector towards the rear of the vehicle.

FIG. 2 shows a simple example of the axis of articulation 11 common to the two sectors, that is, exterior sector 9 and interior sector 8. Only the interior sector is pierced by an orifice to allow the passage of a bolt 18, whose body serves as a pivot and which screws into a plate 19 cemented onto the interior wall of the exterior sector 9. The thickness of the plate 19 is appropriate to the spacing of the sectors, determined by the distance between the grooves 12 of the upper elastic seal 13 and between the tracks 10 of the curved side 6 of the window. The bolt screws into the plate 19 only far enough to permit a small amount of play to remain between the base of its head and the plate, such that the rotation of one sector with respect to the other is not impeded. In this example, each sector is held and supported, in the course of pivoting, by the seal of the doorframe, between its curved side 6 and its upper rounded-off part 20, at the juncture of the two straight sides 4, 5. The example of FIG. 3 offers additional advantages, despite a more complex mounting. Actually, the two sectors 8, 9 are traversed by a pivot composed of two parts that screw together. The first part is a bolt 21 traversing the exterior sector 9 and the second part is a stay bolt 22 traversing the interior sector 8, these parts being rigid, but not impeding the pivoting of the sectors, in the same way as in the preceding example.

The stay bolt 22 forms, against the interior wall of the interior sector 8, a flange 23 integral with a bracket 24 attached to the door frame 25, on the extension of the aforementioned bisector 7. The more rigid construction permits the door frame 25 to support the weight of the glass sectors 8, 9, through the intermediacy of the pivot 21, 22, which facilitates sliding and significantly avoids wearing of the tracks 10. In addition, the rigidity of the bracket 24 avoids all risk that the sectors will accidentally come out of the upper grooves 12, when they are in an intermediate position between being completely closed and completely open, in which case they are not held by one of the straight sides 4, 5 of the window frame.

Figure 5:
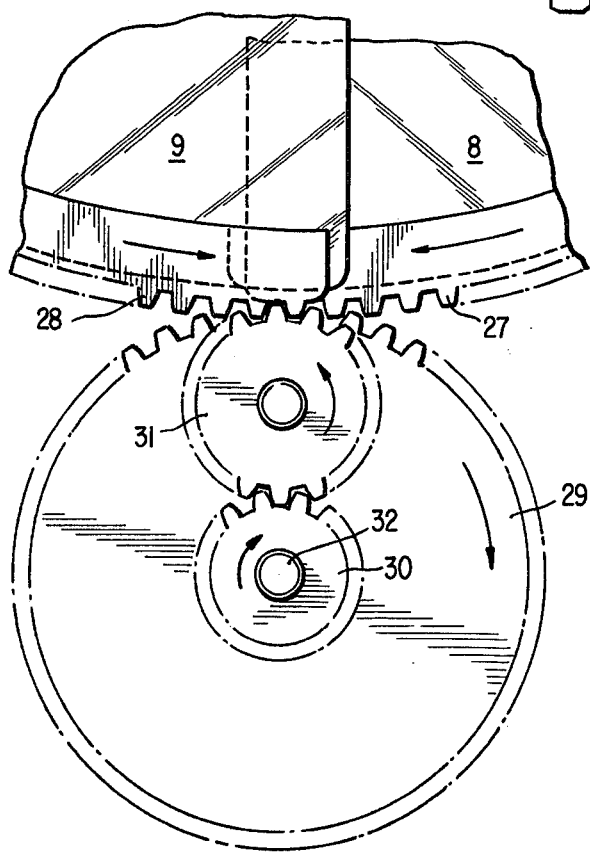
FIG. 5 is an end view of the preceding control mechanism, showing the reversal of the direction of motion of the glass sectors.
Figure 6:
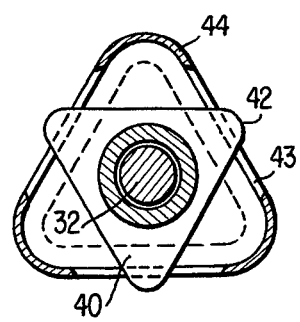
FIG. 6 represents a sectional view, taken along the line BB of FIG. 4 of the dual-position locking mechanism.

FIGS. 4, 5, and 6 show a selective mechanism 26 for controlling the rotation of the glass sectors 8, 9 by gears and teeth. In this model, the tracks are eliminated and replaced by toothed rails 27, 28, set along the curved edges of the respective sectors 8, 9, cooperating with toothed gears 29, 30, either directly, as in the case of gear 29, or through an intermediate gear 31. The driving gears 29, 30 are turned by a common shaft 32, ending in a knob 33 mounted on the door frame 34 in the interior of the vehicle, approximately in the middle of the curved side of the window. The common shaft 32 traverses a U-shaped bracket 35 having one flange 36 soldered inside the door frame 34 and to a second flange 37 which supports the shaft 32, such that the driving gears 29, 30 are located on either side of the second flange of the bracket. This flange also supports the axis of the intermediary gear 31, which will be used to move the exterior glass sector 9, whose toothed track 28 always engages the intermediary gear. It can be seen from FIG. 4 that the glass sectors 8, 9 penetrate the interior of the door frame 34, beneath the window, with the interposition of a waterproof seal 38 mounted on the frame along the curved edge 6 of the window. One characteristic of the control mechanism 26 is that the common shaft 32 is translationally mobile, permitting it to occupy either of two preselected stable positions in which the driving gears operated one or the other of the glass sectors, but in opposite directions. In the illustration, FIG. 4 shows the large gear 29 engaged with the toothed track 27 of interior sector 8, but a displacement of the shaft 32 in the direction of arrow F would make it possible to operate the exterior sector 9 in the opposite direction, through the intermediary of the intermediary gear 31 and of the small gear 30. To effect this operation, the end of the shaft 32 near the knob is integral rotationally and translationally with a locking device 39, comprising a triangular part 40 activated through rotation of a selector knob 41, which part can be retained by its peaked extensions 42 against the edges 43 of a fixed box 44 of the same shape as part 40, integral with the door frame, by the action of an adjustment spring 45 pushing on a collar 46 built onto the shaft 32. FIG. 6 shows with solid lines the triangular part 40 held in the position of FIG. 4 and with dotted lines the position which that part would occupy if the small gear 30 were operating the exterior sector 9.

FIG. 5 is an end view along arrow F of FIG. 4 of the control mechanism and may be superposed upon FIG. 1 by centering the shaft 32 of the gears on the bisector 7, under the window. Rotation of knob 33 in a trigonometric direction, from the interior of the vehicle, makes the chosen sector pivot in the direction of the arrows of FIG. 5, depending on which driving gear is selected with the aid of locking device 39. At the same time, control mechanism 26 supports the glass sectors by their toothed tracks 27, 28 well enough so that the simple pivot 18, 19 of FIG. 2 is sufficient in this case.

Numerous variations may be envisioned in the embodiment described. In particular, the glass sectors could cover unequal areas so long as their sum comprised between a quarter and a half-circle. Other types of locking catches of equivalent function could also be used for moving them. Furthermore, it is possible, without departing from the scope of this invention, to extend the guide rail along the entire length of the curved edge of the window and to place a catch for manipulation on each glass sector, near the angles formed by the straight sides 4, 5 and the curved side 6 of the window. It is not obligatory that both sectors slide, but rather one or the other could remain fixed and the other could slide, pivoting through the action of a single catch, as well as a system of gears and teeth of simple action.

The invention is applicable especially to automobile windows, offering at the same time a greater lateral field of vision and an original style.

We claim:

1. A window assembly, especially for automobile bodies, comprising a sliding glass window mounted in an automobile body, in the shape of a sector, wherein the window comprises first and second glass sectors connected by pivot means for movement of said first and said second glass sectors about a common axis situated in the angle formed by the junction of the straight sides of the sectors.

2. The window assembly of claim 1, wherein said glass sectors cover, in closed position, a total area configuration between a quarter circle and a semi-circle.

3. The window assembly of claim 2, wherein said first and said second glass sectors have identical areas and partially overlap one another in the closed position, approximately along the bisector of the angle formed by the remote straight sides of said first and said second glass sectors.

4. The window assembly of claim 1, wherein said pivot means traverses at least one of said first and second glass sectors.

5. The window assembly of claim 4, wherein one extremity of said pivot means is integral with an upper frame of the window assembly by means of a bracket member.

6. The window assembly of claim 1, which further comprises a track extending along the length of a curved edge of the window sectors wherein at least one of said first and said second glass sectors pivots about said common axis and slides on said curved edge.

7. The window assembly of claim 6, wherein one of said first and said second said glass sectors is provided with a locking catch for moving said one of said first and said second glass sectors and for holding said one of said first and said second glass sectors in closed position.

8. The window assembly of claim 7, wherein said track includes a plurality of slots into which said locking catch is securable.

9. The window assembly of claim 6, wherein said first and second glass sectors are movable and manipulable by a control mechanism mounted a door frame approximately in the middle of said curved edge of the window sectors, said control mechanism comprising first and second gears mounted on a common shaft such that each of said first and said second gears engages a respective toothed track affixed to the edge of the curved side of the corresponding sector such that the selection of one of said first and said second gears by means of a locking device and rotation of said common shaft by means of a knob makes it possible, in a first selection position, to rotate one of said first and said second sectors in one direction and, in a second selection position, to rotate the other of said first and said second glass sectors in the direction opposite to said one direction, by means of an intermediate gear.

10. The window assembly of claim 9, which further comprises means for retaining said knob in one of said first and said second selection positions.

11. The window assembly of claim 10, wherein said means for retaining said knob comprises a fixed box integral with said door frame and means connected to said knob engageable with said fixed box.

* * * * *